United States Patent [19]

Nounin et al.

[11] Patent Number: 5,203,027
[45] Date of Patent: Apr. 13, 1993

[54] DIVERSITY RECEIVER FOR EQUALIZING A DATA SIGNAL DISTORTED IN A SIGNAL TRANSMISSION ROUTE

[75] Inventors: Katsuya Nounin; Katsumi Sakakibara, both of Kanagawa; Mutsumu Serizawa, Tokyo; Koji Ogura, Kanagawa, all of Japan

[73] Assignee: Kabushiki Kaisha Toshiba, Kawasaki, Japan

[21] Appl. No.: 618,404

[22] Filed: Nov. 27, 1990

[51] Int. Cl.$^5$ .............................................. H04B 7/08
[52] U.S. Cl. ..................................... 455/134; 375/13; 375/100; 455/135
[58] Field of Search ................................. 455/133-140, 455/273, 276, 277, 278; 375/11-14, 40, 100

[56] References Cited

U.S. PATENT DOCUMENTS

| | | | |
|---|---|---|---|
| 4,733,402 | 3/1988 | Monsen | 375/100 |
| 4,972,434 | 11/1990 | Le Polozec et al. | 375/14 |
| 5,031,193 | 7/1991 | Atkinson et al. | 375/13 |

FOREIGN PATENT DOCUMENTS

| | | | |
|---|---|---|---|
| 63-51737 | 3/1988 | Japan . | |
| 0274025 | 11/1990 | Japan | 455/135 |

Primary Examiner—Reinhard J. Eisenzopf
Assistant Examiner—Chi H. Pham
Attorney, Agent, or Firm—Foley & Lardner

[57] ABSTRACT

Diversity receiver having many diversity branches comprises adaptive equalization sections for equalizing the training signal sampled on the basis of adjustable tap coefficients, and adjusting the tap coefficient every code element in the training signal so as to minimize the intensity of an error signal defined by the difference between the equalized training signal and the already-known training signal, error signal intensity detecting sections for detecting the intensity of the error signal every code element, a switching section for switching to a diversity branch having the minimum signal intensity of error signals in the respective diversity branches.

8 Claims, 13 Drawing Sheets

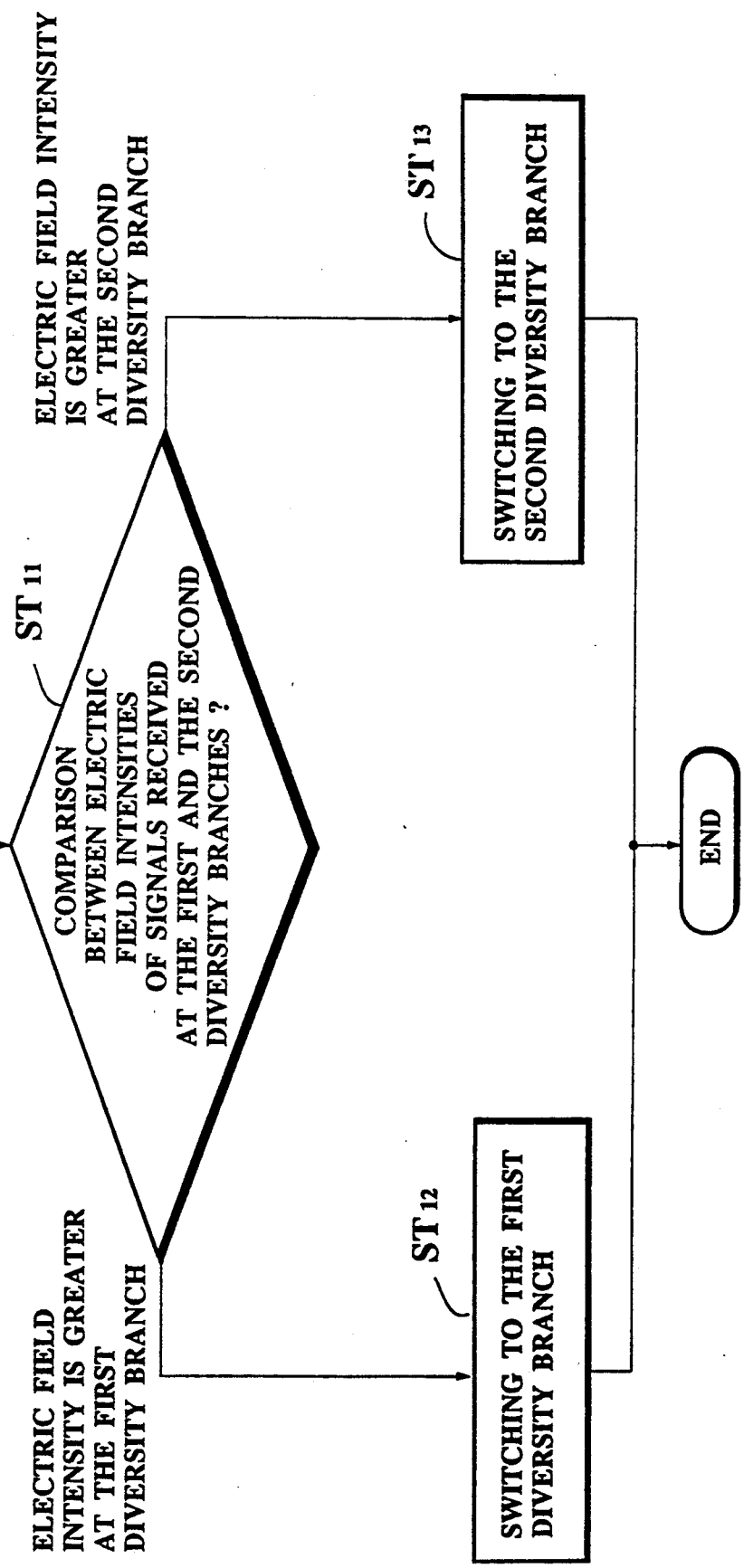

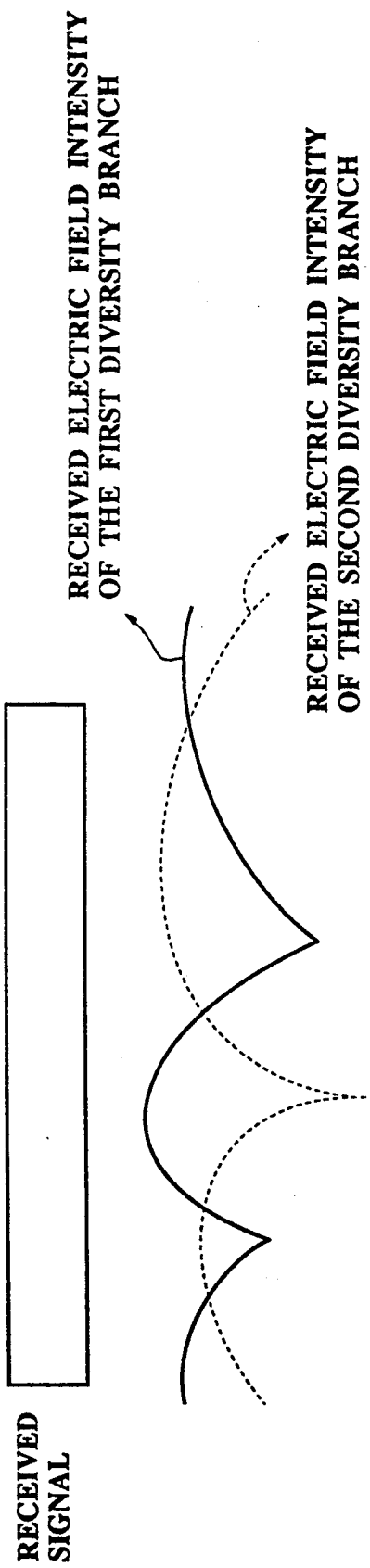
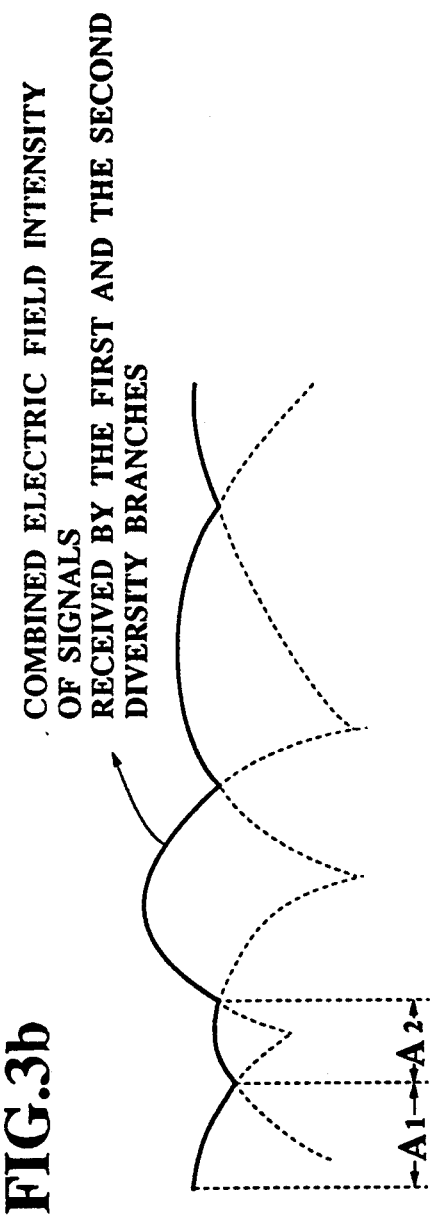

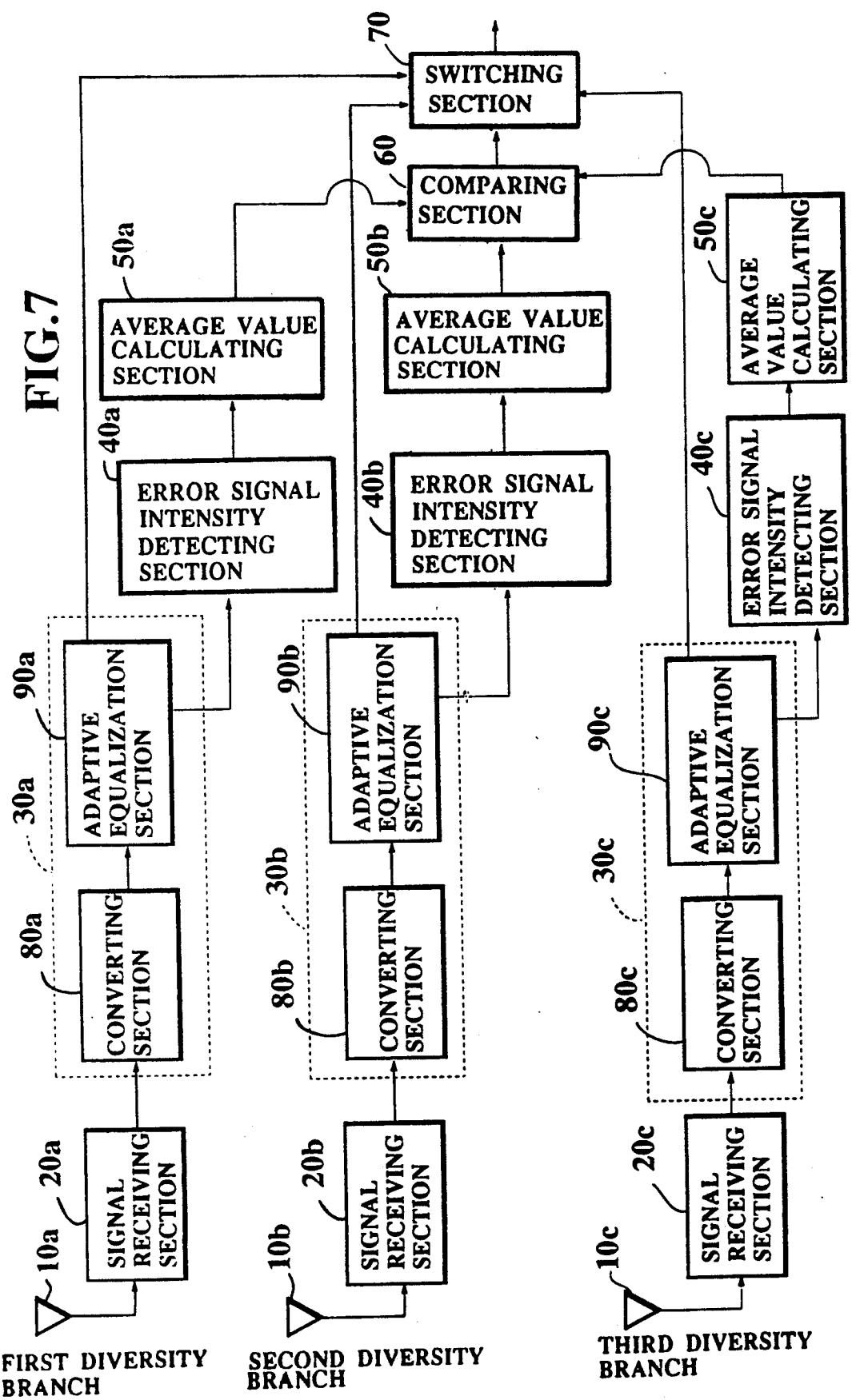

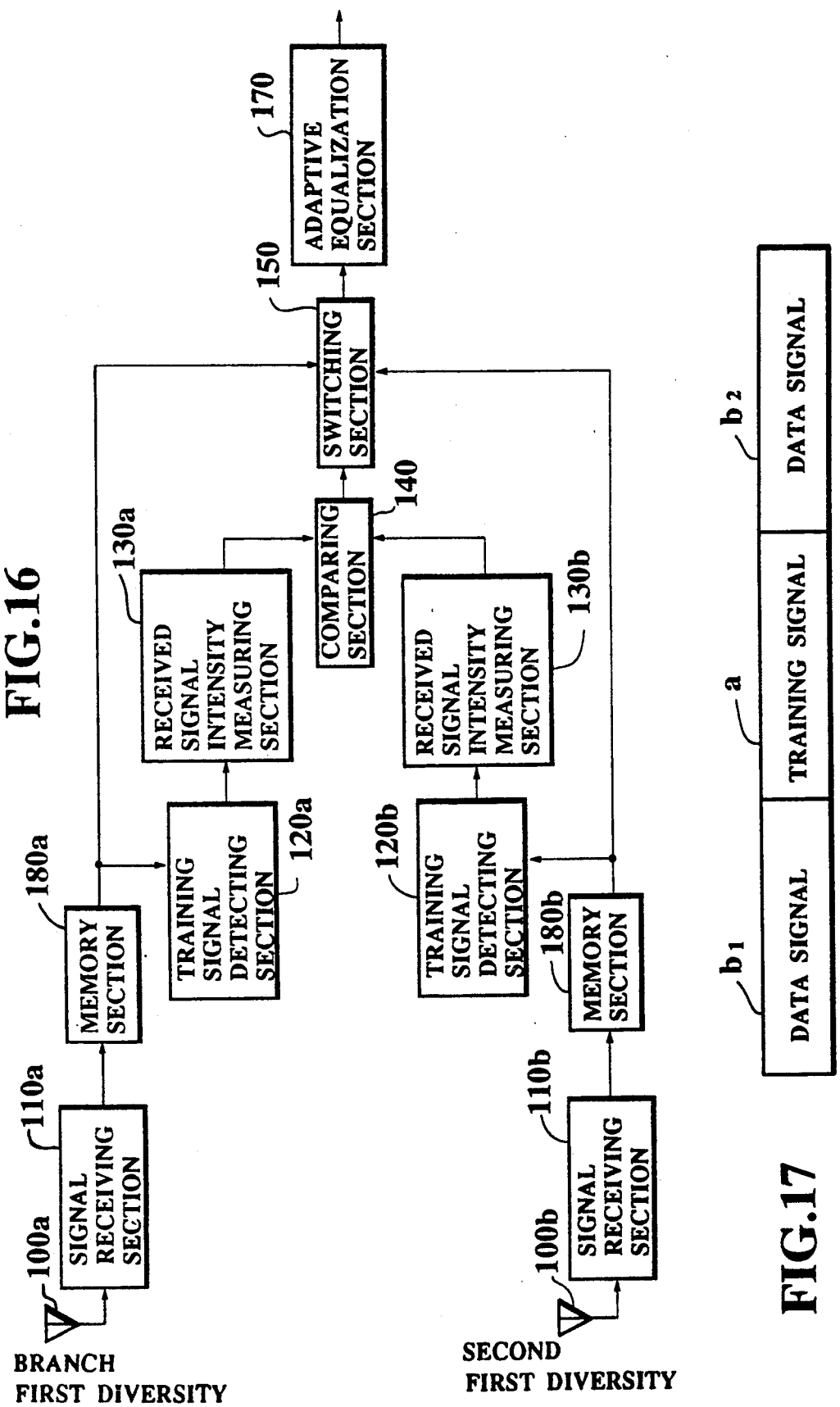

DIVERSITY RECEIVER FOR EQUALIZING A DATA SIGNAL DISTORTED IN A SIGNAL TRANSMISSION ROUTE

BACKGROUND OF THE INVENTION

1. Field of the Invention

The present invention relates to a diversity receiver, and particularly to a diversity receiver which has an adaptive equalizer and can select a diversity branch having a most preferable transmission quality in an instant.

2. Description of the Background Art

Conventionally, in digital mobile communication between a fixed station and a mobile station or between mobile stations, a diversity receiver which can provide received signals excellent in the transmission quality by removing influence of standing waves generated by fading, that is, the interference caused by differences of transmission routes of signals has been used.

FIG. 1 shows a block diagram of a conventional diversity receiver.

The diversity receiver generally comprises a first diversity branch and a second diversity branch. In more detail, the receivers comprise antennae 200a, 200b for receiving signals respectively transmitted through different transmission routes, signal receiving sections 210a, 210b for respectively converting carrier frequencies of the received signals into intermediate frequencies, received signal intensity measuring sections 220a, 220b for respectively measuring electric field intensities of received signals converted by the signal receiving sections 210a, 210b, a comparing section 230 for comparing the electric field intensities respectively measured by the signal intensity measuring sections 220a, 220b, a switching section 240 for selecting a diversity branch having a electric field intensity greater than that of the other on the basis of the comparison result at the comparing section 230.

Based on the construction mentioned above, operation modes of the comparing section 230 and the switching section 240 are explained with reference to a flowchart shown in FIG. 2 and received electric field intensity shown in FIGS. 3a and 3b.

First, as shown in FIG. 2, each electric field intensity of received signals transmitted in the form of burst in the comparing section 230 are compared with each other at a step ST11. When a received electric field intensity of a first diversity branch is greater than that of a second diversity branch, the first diversity branch is selected at a step ST12. Conversely, when the electric field intensity of the second diversity branch is greater, the second diversity branch is selected at a step ST13.

Namely, as shown in FIG. 3a, by the influence of a standing wave based on interference, when one signal designated by a solid line is received by the first diversity branch, and the other signal having a wave form different from that of the signal and designated by a broken line is received by the second diversity branch, a part of a signal having a field intensity greater than that of the other is always selected in a burst, as shown by solid lines in FIG. 3b.

In such a manner, in the above diversity receiver, a part of a signal having a greater electric field intensity is always selected to improve the transmission quality one by one.

In this case, signals actually received by the receiver generally include signals being the so-called ghost, reflected by obstacles existing around the transmission routes thereof. Then, to remove the ghost, it is thinkable to provide the diversity receiver with an adaptive equalizer in tandem connection.

However, since each signal received by diversity branches has the peculiar transmission route characteristic, the adaptive equalization by the adaptive equalizer becomes meaningless when the diversity branches for receiving signals transmitted in the burst forms are switched to each other in a period of same burst.

In this case, each signal received by diversity branches is transmitted in the form of a packet which is constructed so that a row of code elements in carried by a carrier wave as shown in FIG. 4. On addition, the row of code elements comprises an already-known training signal a whose code elements is known in advance, and an unknown data signal b which follow the signal a and is to be decoded. The packed is transmitted by radio at predetermined time intervals in the form of burst.

A period from a time t1 to a time t2 is called a training mode period, and in this period the training signal a is received in diversity branches. And a period from the time t2 to a time t3 is called a decision feedback mode period. And in this period the data signal b is received in diversity branches.

Therefore, to solve the problem, a diversity receiver equipped with an equalizer as shown in a block diagram in FIG. 5 is proposed (Japanese Patent Application for Disclosure No. 63-51737).

Therefore, to solve the problem, a diversity receiver equipped with an equalizer as shown in a block diagram in FIG. 5 is proposed (Japanese Patent Application for Disclosure No. 63-51737).

The diversity receiver having an equalizer generally comprises a first diversity branch and a second diversity branch, wherein a signal received by a first antenna 300a at the first diversity branch is selected a suitable frequency and amplified by a first signal receiving section 310a, then transmitted to a first demodulating section 320a.

The first demodulating section 320a is provided with an adaptive equalizer so as to remove the ghost contained in the input signals and demodulate them into digital signals. The digital signals demodulated at the first demodulating section 320a are sent to a first training signal detecting section 330a during the training mode period, and digital values of the training signal is detected. Then, each detected digital value is compared with a correct digital value which is informed a first error deciding section 340a in advance to decide a code error rate defined by the total number of different digital values.

On the other hand, in the second diversity branch, a second antenna 300b, a second signal receiving section 310b, a second demodulating section 320b, a second training signal detecting section 330b and a second error deciding section 340b respectively carry out completely the same operation with the operation described in the first diversity branch.

Then, the error rate decided at the first error deciding section 340a and the error rate decided at the second error deciding section 340b are compared with each other at a comparing section 350 so as to select the diversity branch having the received signal of the lower error rate. In accordance with the result of that selection, a switch 360 is controlled to select the diversity branch having the signal of the lower error rate. In other words, only the data signal b following the training signal a received by the selected diversity branch are adopted over one burst interval.

Accordingly, in the diversity receiver equipped with the equalizer, the ghost is removed by the adaptive equalization carried out by the first demodulating section 320a and the second demodulating section 320b, and after the input signals are demodulated by the first demodulating section 320a and the second demodulating section 320b, the error rates are respectively decided by the first error deciding section 340a and the second error deciding section 340b so as to select one of these diversity branches in a burst interval. In the other words, when the adaptive equalization can be utilized the switching operation of diversity branches is not carried out during a burst interval.

The reasons why the error rate after the demodulation at the first demodulating section 320a are different from the error ratio after the demodulation by the demodulating section 320b is that when the received electric field intensity is small, the demodulation accuracy is reduced depending on the degree of the electric field intensity. Particularly, when the received electric field intensity is smaller than a threshold value which is a limit of demodulation at the first signal receiving section 310a or the second signal receiving section 310b, the demodulation at the first signal receiving section 310a or the second signal receiving section 310b can not be ordinarily carried out.

Accordingly, as shown in FIG. 6, even when an average received electric field intensity of the training signal a of the first diversity branch is smaller than that of the second diversity branch, the first diversity branch can carry out a training with accuracy during the training period mode if the received electric field intensity of the training signal a of the second diversity branch is temporarily lower than the threshold value by fading and the like. This means that even if the average received electric field intensity is small in the first diversity branch, the demodulation accuracy thereof is superior to that of the second diversity branch.

Moreover, in such a diversity receiver equipped with an equalizer as mentioned above, the measurement accuracy of the error rate is a very important problem. That is, it is necessary to elongate the measuring time to improve the measurement accuracy of the error rate. However, it also takes a long time to complete the selection of the diversity branch. To the contrary, if the time required for the selection of the diversity branch is reduced, the accuracy of the error rate is lowered.

On addition, since the diversity branch not selected is also operated with the selected diversity branch, the power consumption required for the operation is increased in proportion to the number of the diversity branches.

SUMMARY OF THE INVENTION

Accordingly, the present invention was made to solve the problems of the prior art. Therefore, it is an object of the present invention to provide a diversity receiver in which an adaptive equalizer can be correctly operated even when the receiver is applied to TDMA (Time-Division Multiple Access) digital mobile communication, and a suitable diversity branch having a most preferably transmission quality can be selected in an instant.

Accordingly, a first diversity receiver of the present invention to solve the problems has a plurality of diversity branches arranged in parallel, and each of the diversity branch comprises signal receiving means for receiving a radio wave for carrying a training signal already known and a data signal following the training signal and demodulating the radio wave into a suitable intermediate frequency or a baseband frequency, converting means for sampling the training signal and the data signal from the received signal demodulated by the signal receiving means, adaptive equalization means for equalizing the received signal sampled by the converting means on the basis of adjustable tap coefficients, and adjusting the tap coefficients every code element in the received signal so as to minimize the intensity of an error signal defined by the difference between the equalized training signal and the already-known training signal in a training mode period, and error signal intensity detecting means for detecting the intensity of the error signal every code element.

moreover the diversity receiver includes selecting means for selecting a diversity branch having the minimum error signal intensity output of the diversity branches.

In the diversity receiver, the plurality of diversity branches are arranged in parallel so as to respectively receive radio waves carrying the already-known training signals and data signals following the training signals. Each of the received signals is demodulated into a suitable intermediate frequency or a baseband frequency by the signal receiving means, the sampled by the converting means so as to be converted into a training signal and a data signal comprising a group of code elements. Thereafter, the resultant signals are transmitted to the adaptive equalization means. In the adaptive equalization means, each code element of the training signal are successively transmitted at first, then prior to the processing of the data signal, the adaptive equalization means is subjected to the learning so as to give the most suitable equalizing function thereto.

In more detail, in the adaptive equalization means, the first code element of the training signal is equalized at first, then an error signal defined by the difference between the equalized training signal and the already-known and true training signal is detected. The equalizing function in the adaptive equalization means are adjusted by changing the tap coefficients to minimize the intensity of the error signal. Then, the second code element and the following ones of the training signal are successively subjected to the equalization adjusted by the former codes, and at the same time the adaptive equalization means are successively adjusted the equalizing function. By repeating such equalization adjustment, the data signal following the training signal can be subjected to the most suitable equalization by the adaptive equalization means.

Then, the total sum of the averages obtained from each changing intensity of error signals is the diversity branches is calculated and a diversity branch having the minimum sum of each intensity of the error signal is selected because of carrying out the most suitable equalization in the diversity receiver.

On the basis of the selection, the data signal is equalized by the adaptive equalization means of the selected diversity branch.

Accordingly, in the first diversity receiver of the present invention, since a diversity branch having the most suitable equalizing function can be selected, it becomes possible to equalize the data signal most suitably and expect the excellent demodulation in the diversity receiver.

Moreover, since it is possible to make the intensity of the error signal to a minimum in an instant by adjusting the tap coefficients by using a suitable algorithm, a satisfactory demodulation accuracy can be guaranteed by using a conventional training signal.

Alternatively, the selecting means may be so constructed as to stop operation of diversity branches not selected by the selecting means by outputting a shutdown signal thereto.

Accordingly, since the diversity branches not selected are only operated for the training signal and are stopped during the period receiving the data signal which is generally required much greater processing amount then the training signal, the power consumption can be greatly reduced.

In the specific embodiment of the present invention, the error signal intensity detecting means of each diversity branch may comprise average value calculating means for obtaining an average value of an only group of code elements having sufficiently stable and small values among error signals, and the selecting means may select a diversity branch on the basis of an average error signal intensity outputted from the average value calculating means.

Accordingly, since a diversity branch capable of carrying out the equalizing function based on the value approximate to the most suitable tap coefficients when the data signals are actually equalized can be selected, the selecting accuracy of the diversity branches can be improved.

In the specific embodiments of the invention, each of the diversity branches further comprises received signal intensity detecting means for detecting an electric field intensity of the training signal demodulated by the signal receiving means, and the received signal intensity detecting means may be operated with a weighting added to the error signal intensity detected by the error signal intensity detecting means.

The reason for operated by the weighting is that the reception quality is inferior and the equalization can not be sufficiently conducted when the electric field intensity of the training signal is small. Thus, it is preferred to make a coefficient of the weighting greater as the electric field intensity of the training signal is smaller.

Accordingly, since the weighting is added to the error signal intensity in accordance with the electric field of the training signal, it becomes possible to realize further excellent equalization and improve the selecting accuracy for diversity branches.

On addition, in the specific embodiments of the present invention, each of the diversity branches further comprises average received signal intensity detecting means for detecting an average electric field intensity of the training signal demodulated by the signal receiving means, and the average received signal intensity detecting means may be operated with a weighting added to the average error signal intensity outputted from the average value calculating means.

Moreover, a second diversity receiver of the present invention has a plurality of diversity branches arranged in parallel, and each of the diversity branches comprises signal receiving means for receiving a radio wave for carrying an already-known training signal and a data signal following the training signal, and demodulating the radio wave into a suitable intermediate frequency or a baseband frequency, training signal detecting means for detecting only the training signal from the received signal demodulated by the signal receiving means, received signal intensity measuring means for measuring the electric field intensity of the training signal detected by the training signal detecting means, and delay means for delaying the received signal demodulated by the signal receiving means by a time interval for which the training signal is carried, moreover the diversity receiver includes selecting means for selecting a diversity branch having the maximum received signal electric field intensity from each electric field intensity of received signals measured by the received signal measuring sections, converting means for sampling the training signal and the data signal from the received signal delayed by the delay means of a diversity branch selected by the selecting means, and adaptive equalization means for equalizing the received signal sampled by the converting means on the basis of adjustable tap coefficients, and adjusting the tap coefficients every code element in the received signal so as to minimize the intensity of an error signal defined by the difference between the equalized training signal and the already-known training signal in a training mode period.

In the diversity receiver, the received signal demodulated by the signal receiving means is delayed by the delay means till a suitable diversity branch is selected by the selecting means. At the same time, only the training signal occupying the former half portion of the received signal received at the signal receiving means is detected by the training signal detecting means, and a diversity branch having the maximum electric field intensity is selected. Then, the received signal obtained from delay means of the selected diversity branch is equalized.

Accordingly, in the second diversity receiver of the present invention, since only one adaptive equalization means requiring a relatively large layout area is used to the plurality of diversity branch, it becomes possible to make small the size of the diversity receiver though the received signal is delayed while the training signal is transmitted.

It is preferred that a stop signal outputted by selecting means may stop the operation of the diversity branches not selected.

Moreover, a third diversity receiver of the present invention has a plurality of diversity branches arranged in parallel, and each of the diversity branches comprises signal receiving means for receiving a radio wave for carrying an already-known training signal and one or more data signals connected to the front or the rear of the training signal, and demodulating the radio wave into a suitable intermediate frequency or a baseband frequency.

memory means for storing the received signal demodulated by the signal receiving means, training signal detecting means for detecting only the training signal from the memory means, and received signal intensity measuring means for measuring the electric field intensity of the training signal detected by the training signal detecting means, moreover the diversity receiver includes selecting means for selecting a diversity branch having the maximum received signal electric field intensity from each received signal intensity of the diversity branches measured by the received signal intensity measuring means, converting means for sampling the training signal and the data signals from the received signal stored in the memory means of the diversity branch selected by the selecting means, and adaptive equalization means for equalizing the received signal sampled by the converting means on the basis of adjustable tap coefficients, and adjusting the tap coefficients every code element in the received signal to as to minimize the intensity of an error signal defined by the difference between the equalized training signal and the already-known training in a training mode period.

In the diversity receiver, all the received signals demodulated by the signal receiving means are temporarily stored in the memory means. Then, only the training signals are detected from each of the stored received signals, and a diversity branch detecting the training signal having the maximum electric field intensity is selected based on the measurement of the electric field intensity. Subsequently, a received signal transmitted from memory means of the selected diversity branch is equalized.

Accordingly, in the third diversity receiver, since all the received signals are temporarily stored in the memory means, even when one or the more training signals are located at the latter half section of the received signals, it is possible to detect one or the more training signals only so as to select a suitable diversity branch.

BRIEF DESCRIPTION OF THE DRAWINGS

FIG. 2 is a flowchart to show the operation of the diversity receiver shown in FIG. 1, FIG. 3a shows an electric field intensity of received signals to be received by the receiver shown in FIG. 1, FIG. 3b shows a combined electric field intensity of received signals to show the operation of the receiver shown in FIG. 1;

FIG. 7 is a block diagram to show a first embodiment of a diversity receiver related to a first modification, FIG. 16 is a block diagram to show a diversity receiver related to a third modification, and FIG. 17 is an explanatory diagram of a signal received by the receiver shown in FIG. 16.

DESCRIPTION OF THE SPECIFIC EMBODIMENTS

Hereinafter, embodiments of the present invention will be explained with reference to the drawings.

FIG. 7 shows a block diagram of a diversity receiver provided with a plurality of diversity branches, which is a first embodiment related to a first modification.

As shown in the same drawing, the diversity receiver of this embodiment has a first to a third diversity branch for respectively receiving signals transmitted through different transmission routes. Among these diversity branches, the first diversity branch is provided with an antenna $10a$ for receiving an analog signal r(t) of a carrier frequency zone, a signal receiving section $20a$ for changing a carrier wave of the signal received at the antenna $10a$ into an intermediate frequency and amplifying the signal, and a demodulating section $30a$ for demodulating the signal whose frequency is changed by the signal receiving section $20a$.

Moreover, the demodulating section $30a$ comprises a converting section for converting a received signal from the intermediate frequency into a signal of a suitable baseband frequency, and an adaptive equalization section $90a$ for equalizing the received signal converted by the converting section $80a$ and generating an error signal described hereinafter.

Furthermore, the first diversity branch is includes an error signal intensity detecting section $40a$ for detecting an intensity of an error signal generated from the adaptive equalization section $90a$, and an average value calculating section $50a$ for calculating an average value of error signals detected by the detecting section $40a$.

On the other hand, the second and the third diversity branch have the construction similar to that of the first diversity branch respectively, and comprise antennae $10b$, $10c$, signal receiving sections $20b$, $20c$, demodulating sections $30b$, $30c$, converting sections $80b$, $80c$, adaptive equalization sections $90b$, $90c$, error signal intensity detecting sections $40b$, $40c$ and average value calculating sections $50b$, $50c$, respectively.

Moreover, the diversity receiver, as constructional members thereof, is provided with a comparing section 60 for comparing average values respectively obtained by operations at the average value calculating sections $50a$, $50b$, $50c$, and a switching section 70 is selecting a diversity branch having the minimum average value of error signals based on the comparison result at the comparing section 60.

Figure 1:
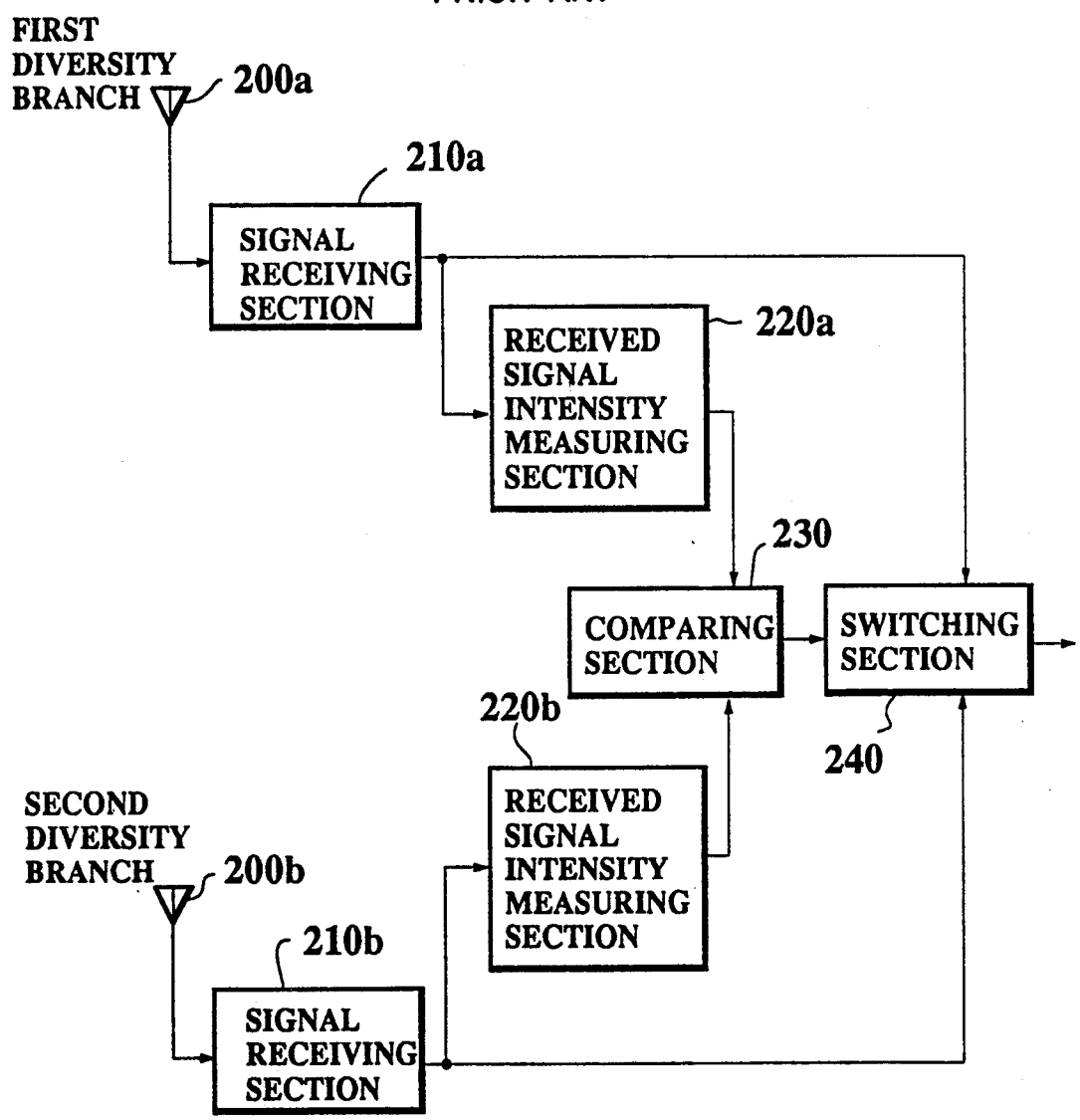
FIG. 1 is a block diagram to show a conventional diversity receiver.
Figure 4:
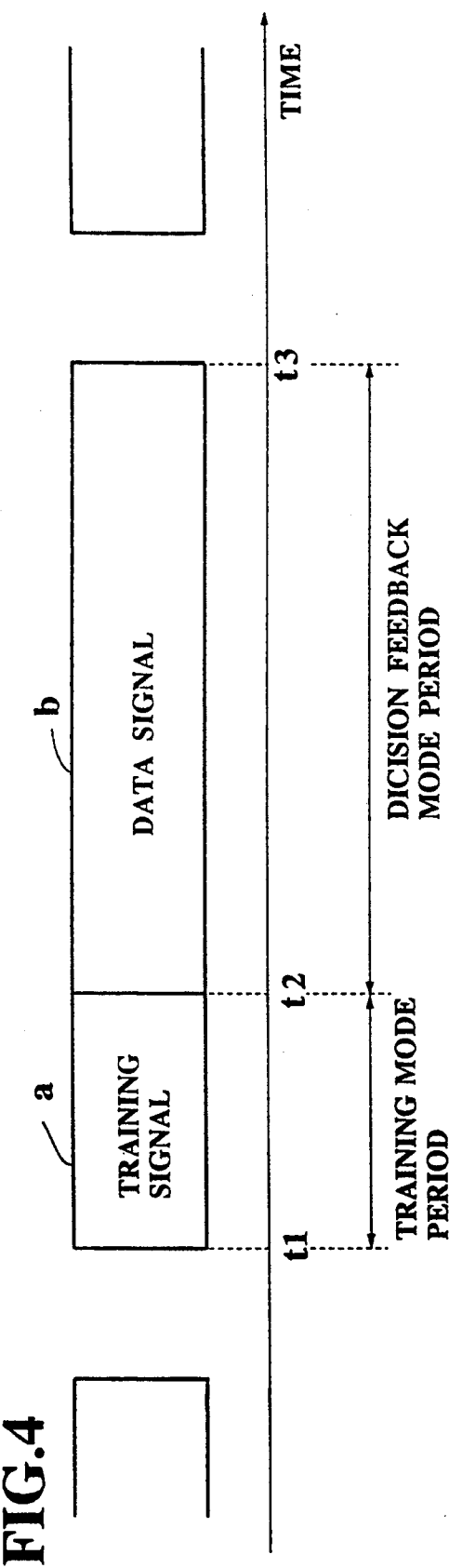
FIG. 4 is an explanatory diagram of a signal.
Figure 6:
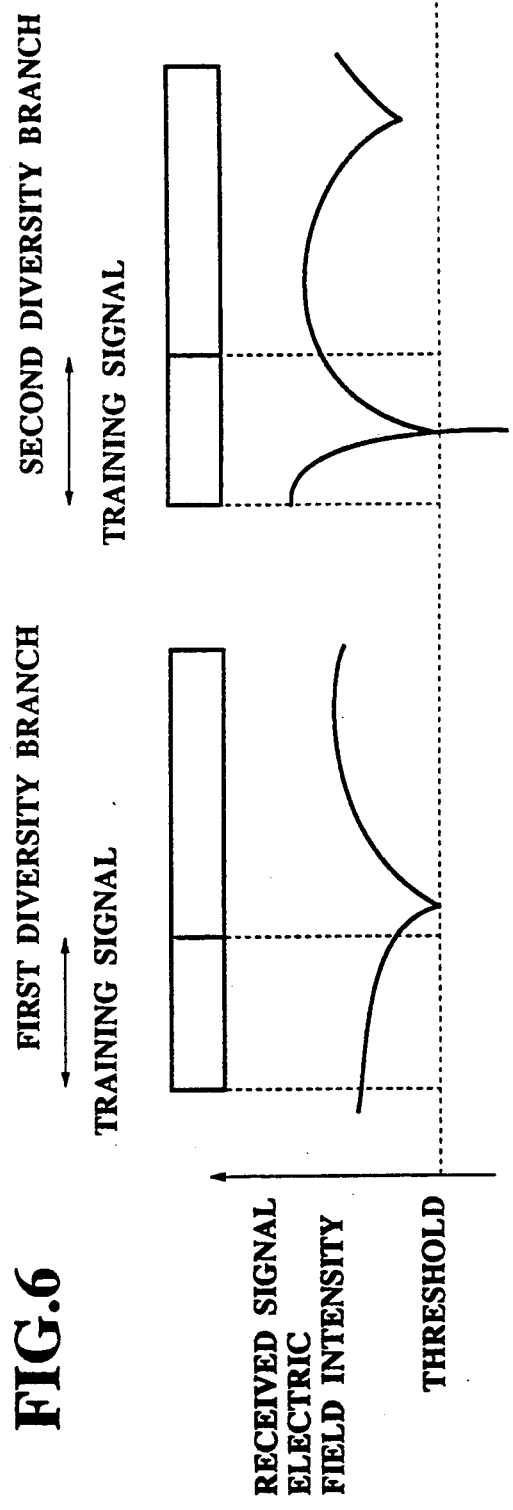
FIG. 6 is an explanatory diagram to show the change of each electric field intensity of a training signal and a data signal.
Figure 5:
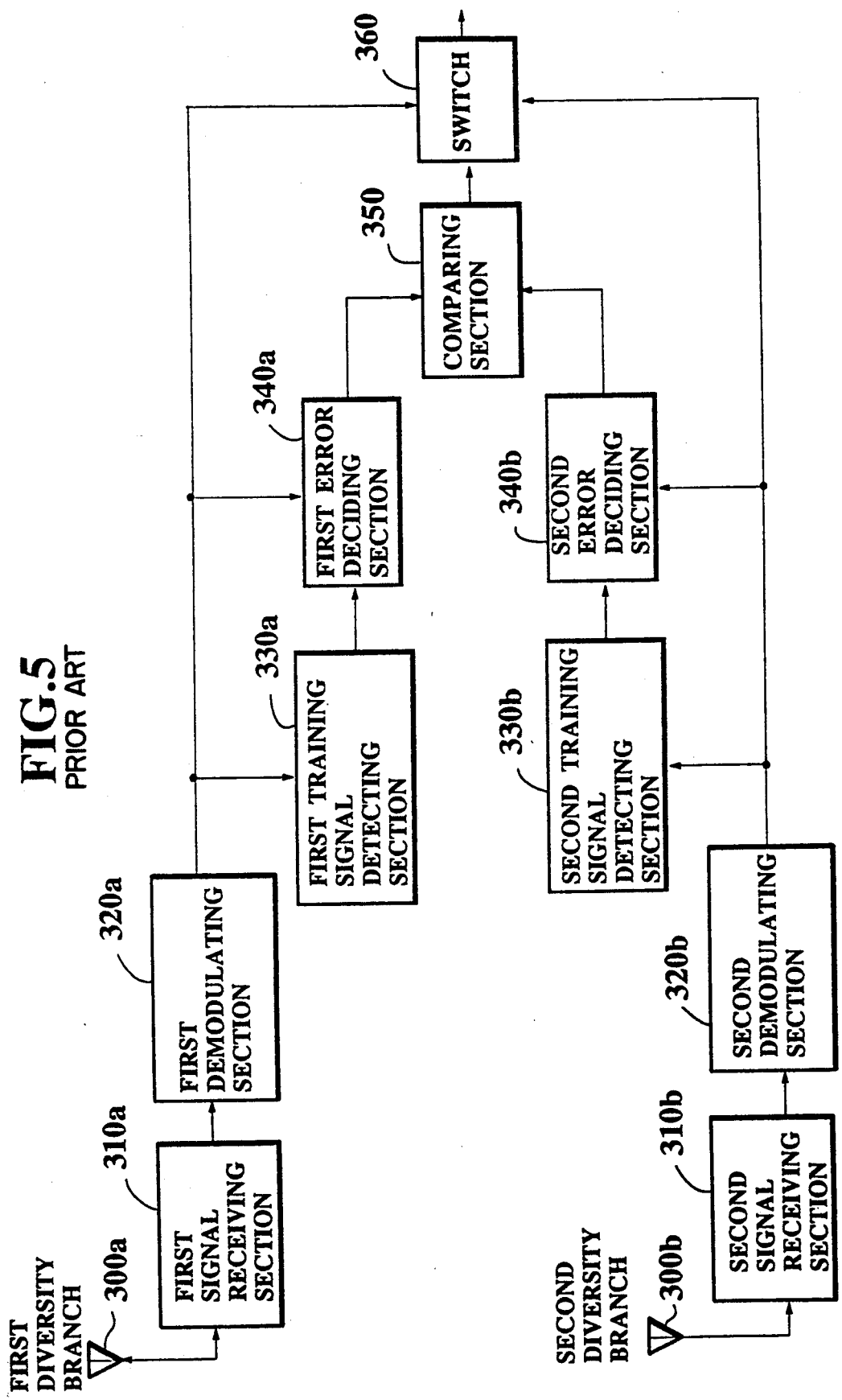
FIG. 5 is a block diagram to show another conventional diversity receiver equipped with an equalizer.

Incidentally, as shown in FIG. 4, each of the signals received by the antennae $10a$, $10b$, $10c$ of the respective diversity branches comprises an already-known training signal a and an unknown data signal b following the training signal a.

Figure 8:
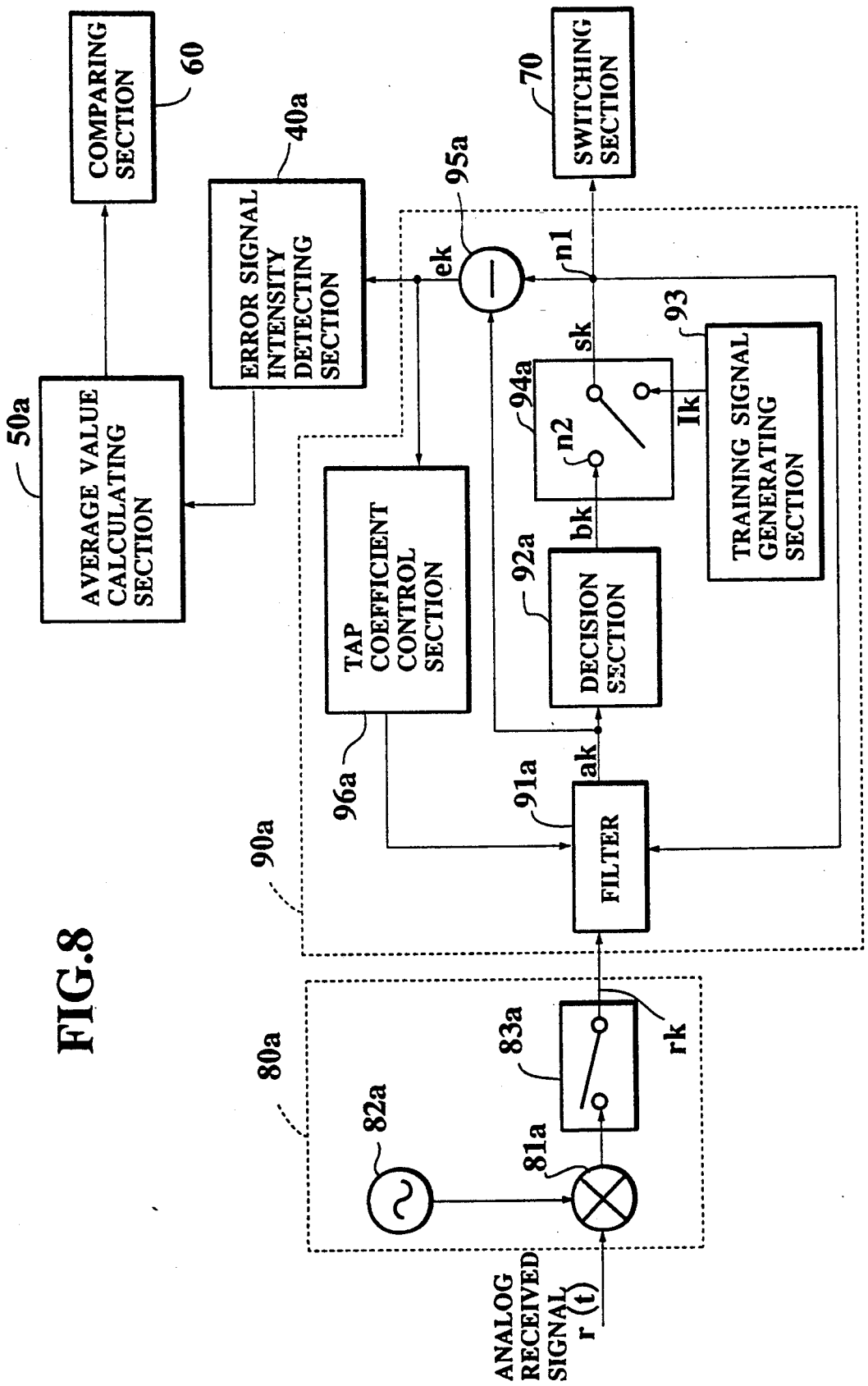
FIG. 8 is a block diagram to fully show a demodulating section of the receiver shown in FIG. 7.

FIG. 8 shows a block diagram of the converting section $80a$ and the equalization section $90a$ respectively composing the demodulating section $30a$.

The converting section $80a$ is composed of a multiplier $81a$, a local oscillator $82a$, and a first switch $83a$. On the other hand, the adaptive equalization section $90a$ is composed of a filter $91a$ comprising a delay line with equipped with tap filters or lattice filters, a decision section $92a$, a training signal generating section 93, a second switch $94a$, an error signal generating section $95a$, and a tap coefficient control section $96a$ for controlling tap coefficients for deciding an equalization function of the filter $91a$.

In the above construction, the analog signal r(t) of a carrier frequency zone received by the antenna 10a of the first diversity branch is converted into an intermediate frequency by the signal receiving section 20a, and amplified and transmitted to the converting section 80a. Then, the analog signal r(t) is multiplied with an output of the local oscillator 82a by the multiplier 81a to be converted into a signal of a baseband frequency. Moreover, the analog signal r(t) converted to the baseband frequency is subjected to a sampling process for a suitable time interval such as a transmission symbol interval at the first switch 83a so as to prepare a digital signal rk. The digital signal rk is composed of code elements, and these code elements are successively transmitted to the filter 91a of the adaptive equalization section 90a. At the adaptive equalization section 90a, different operations are carried out in a training mode period and a decision feedback mode period respectively. A training signal a is processed in the training mode period and a data signal b is processed in the decision feedback mode period.

Next, operation of the adaptive equalization section 90a in the training mode period is explained. The digital signal rk to be transmitted to the filter 91a comprises a group of code elements of the training signal rk. In the filter 91a, distortion of the transmission route of the training signal rk caused by a ghost and the like is compensated by a suitable digital signal process which will be explained below, and a training signal ak having an equalized wave form is outputted. Then, a value of a predetermined group of digital values, which is the nearest to a value of the training signal ak is decided at the decision section 92a, thereafter a training signal bk having the nearest predetermined digital value is outputted in place of the training signal ak.

On the other hand, an already-known true training signal Ik is produced in a predetermined procedure at the training signal generating section 93. The training signal generating section 93 is used at the first to the third diversity branch in common.

Then, by the second switch 94a, the training signal generating section 93 is connected to a node n1 during the training mode period, and the true training signal Ik outputted from the training signal generating section 93 is transmitted to the error signal generating section 95a. At the same time, the training signal ak equalized at the filter 91a is also transmitted to the error signal generating section 95a. Further, at the error signal generating section 95a, an error signal ek defined as the difference between the training signal ak and the true training signal Ik is produced.

Then, at the tap coefficient control section 96a, tap coefficient control signals are renewed based on a value of the error signal ek produced at the error signal generating section 95a. Namely, predetermined initial values of the tap coefficient control signals are renewed by a RLS (Recursive least Square) method, such as Kalman algorithm, Fast Kalman algorithm or square root Kalman algorithm.

Then, at the filter 91a, tap coefficients are corrected by receiving the tap coefficient control signals corresponding to sampling timings at the first switch 83a.

Next time, new code elements of the digital signal rk are transmitted to the filter 91a in which the corrected tap coefficients are stored, and tap coefficients of the filter 91a are corrected again.

The correction of the tap coefficients of the filter 91a is successively carried out over all the group of code elements of the training signal rk not only during the training mode period but also during the decision feedback mode period, so that the tap coefficients are gradually converged.

In such a manner, when each value of the tap coefficients becomes stable, the filter 91a presents the most suitable equalization function to the data signal b following the training signal rk. At the same time, the intensity $|ek|^2$ of the error signal ek produced at the error signal generating section 95a is detected at the error signal intensity detecting section 40a every code element of the training signal rk. The change of intensity of the error signal ek becomes smaller as the values of tap coefficients of the filter 91a are gradually stable. In this embodiment, After the change of intensity of the error signal ek becomes small, for example, each intensity of the error signals ek generated for the eighth and the following code elements of the training signal rk only is successively transmitted to the average value calculating section 50a, and an average value of the intensities of the error signals ek is calculated.

In this case, when the filter 91a is of a so-called decision feedback type, each signal transmitted from the second switch 94a is feedbacked to the filter 91a.

While, also with respect to the second and the third diversity branch, completely similar operations to those described in the first diversity branch are respectively carried out at the antennae 10b, 10c, signal receiving sections 20b, 20c, demodulating sections 30b, 30c, error signal intensity detecting sections 40b, 40c, and average value calculating sections 50b, 50c.

Then, the average values of error signal intensities respectively calculated at the average value calculating sections 50a, 50b, 50 c of the first, second and third diversity branches are compared with one another at the comparing section 60 on completion of the training mode period of signals received by the respective diversity branches, so that the diversity branch having the minimum average intensity value of the error signal ek is selected because the diversity branch has the most suitable transmission quality. Then, based on the selection result, the switching section 70 is controlled so as to pass only signals transmitted from the selected diversity branch. At the same time, operation of the diversity branches not selected at the comparing section 60 is stopped. Namely, with respect to diversity branches whose average values of intensities of the error signal ek are not minimum, if these diversity branches are composed of CMOS, the comparing section 60 stops the operation by cutting off clocks to be given to the diversity branches. To the contrary, if these diversity branches are not composed of CMOS, the operation is stopped by setting off the power source of the diversity branches.

Accordingly, at the adaptive equalization section 90a, the tap coefficients of the filter 91a are so adjusted that the suitable equalizing function to the data signal b which follows the training signal rk can be obtained in the training mode period. And the adjusted tap coefficients are continued to be adjusted in the following decision feedback period once again to get the most suitable equalization.

Next, operation of the adaptive equalization section 90a during the decision feedback mode period after the training mode period is explained. For convenience' sake, it is supposed for the explanation that the first diversity branch is selected at the comparing section 60.

A digital signal rk to be transmitted to the filter 91a comprises a group of code elements. With respect to the data signal rk, distortion of the transmission route caused by a ghost and the like is compensated at the filter 91a, so that a data signal ak having an equalized wave form is outputted. The value of the data signal ak having an equalized wave form is changed into a data signal bk having a predetermined digital value at the decision section 92a in the same manner as in the operation of the training mode period.

In the decision feedback mode, since the decision section 92a is connected to the node n2 by the second switch 94a, the data signal bk is transmitted to the switching section 70.

According, the data signal rk can be subjected to the equalization of the demodulating section 30a whose equalization function is most suitably adjusted by the training signal.

Figure 9:
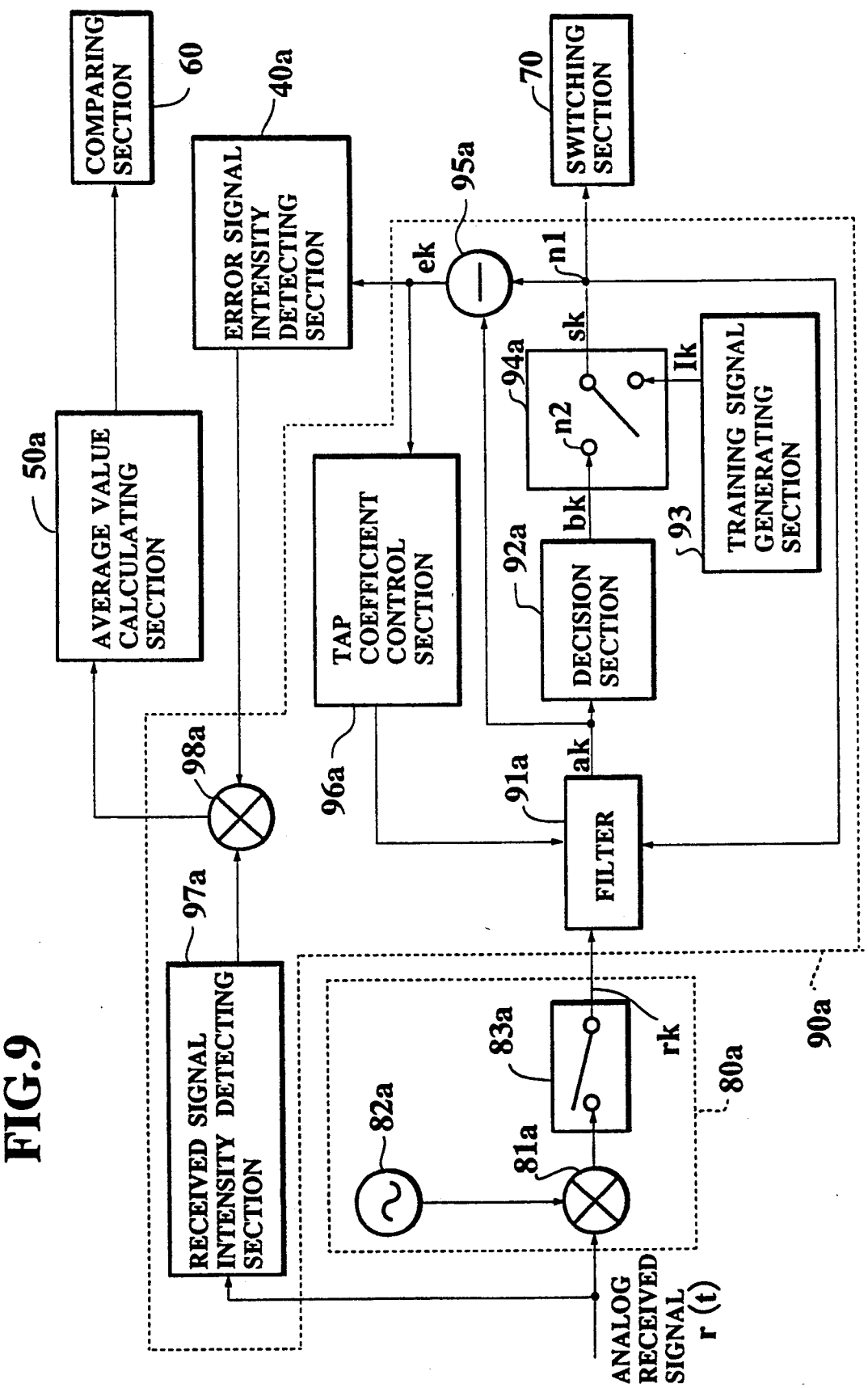
FIG. 9 is a block diagram to show a demodulating section of a second embodiment of a diversity receiver related to the first modification.

FIG. 9 shows a block diagram of a first diversity branch of a diversity receiver related to a second embodiment of the first modification.

In the diversity receiver of this embodiment, a received signal intensity detecting section 97a for detecting an electric field intensity of an analog signal r(t) and a multiplier 98a for weighting the error signal intensity $|ek|^2$ detected by the error signal intensity detecting section 40a based on the intensity of the analog signal r(t) detected by the received signal intensity detecting section 97a are added to an equalization section 90a in a demodulating section 30a of a diversity receiver corresponding to the first embodiment, so that each error signal intensity $W1|ek|^2$ weighted by the multiplier 98a is transmitted to the average value calculating section 50a.

A second and a third diversity branches have the same construction as the first diversity branch.

In such a construction, the analog signal r(t) whose frequency is selectively amplified at a signal receiving section 20a during the training mode period is multiplied by the multiplier 81a, and the intensity of the signal r(t) is detected by the received signal intensity detecting section 98a. Then, the received signal intensity detecting section 97a transmits the detection result to the multiplier 98a.

While, the intensity $|ek|^2$ of the error signal ek detected by the error signal intensity detecting section 40a is also transmitted to the multiplier 98a.

At the multiplier 98a, the intensity $|ek|^2$ is weighted in accordance with a suitable operational equation based on the intensity of the analog signal r(t) detected by the received signal intensity detecting section 97a. The operations for the weighting are successively carried out corresponding to sampling timings at a switch 83a. Moreover, it is the object of the weighting to compensate the inferior reception quality occurred when the intensity of the analog signal r(t) is small, and the inferior conversion quality occurred when the training signal ak having a small value is converted into the training signal bk having a large value at the decision section 92a. In this case, when the intensity of the analog signal r(t) is small, a coefficient W1 of the weighting is set at a greater value compared with a case where the intensity of the analog signal r(t) is great.

Each error signal intensity $W1|ek|^2$ weighted by the multiplier 98a is transmitted to the average value calculating section 50a, then the same operation is carried out as described in the first embodiment.

Accordingly, since the weighting to each error signal intensity is carried out in response to the electric field intensity of the training signal, it becomes possible to realize estimation for further excellent equalization and improve the selection accuracy of diversity branches.

Figure 10:
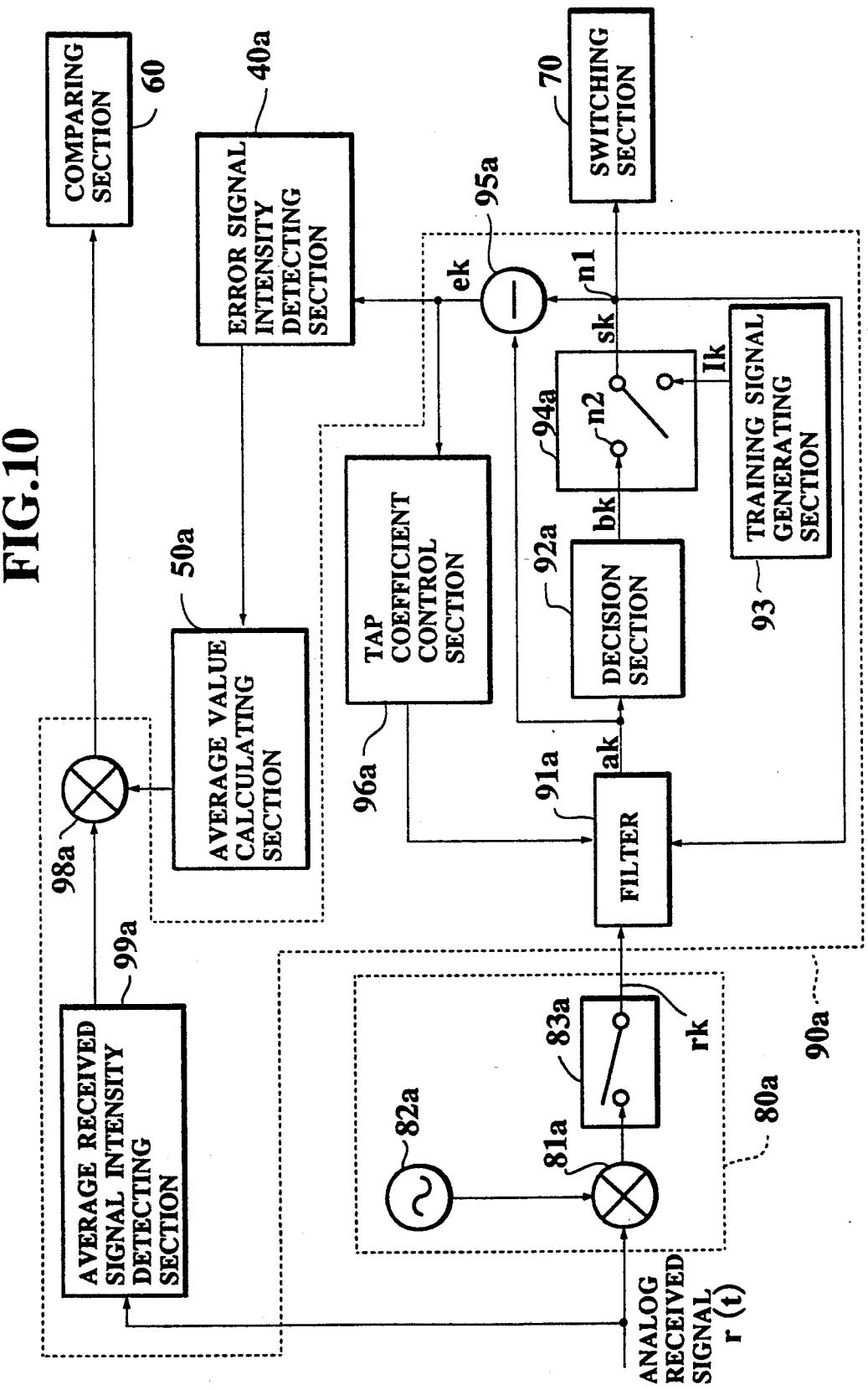
FIG. 10 is a block diagram to show a demodulating section of a third embodiment of a diversity receiver related to the first modification.

FIG. 10 shows a block diagram of a first diversity branch of a diversity receiver related to a third embodiment of the first modification.

In the diversity receiver of this embodiment, an average received signal intensity detection section 99a for detecting an average received electric field intensity of an analog signal r(t) and a multiplier 98a for giving a weighting value W2 to each average received electric field value calculated by an average value calculating section 50a based on the average received electric field intensity of the analog signal r(t) detected by the average received signal intensity detecting section 99a are added to an equalization section 90a in a demodulating section 30a of a diversity receiver corresponding to the first embodiment, so that each error signal intensity $W2|ek|^2$ weighted by the multiplier 98a is transmitted to a comparing section 60.

A second and a third diversity branches have the same construction as the first diversity branch.

In such a construction, the analog signal r(t) of a carrier frequency zone received by an antenna 10a during the training mode period is multiplied by the multiplier 81a, and the average received electric field intensity thereof is detected by the average received signal intensity detecting section 99a. Then, the average received signal intensity detecting section 99a transmits the detection result to the multiplier 98a.

While, the average intensity value of error signals ek calculated at the average value calculating section 50a is also transmitted to the multiplier 98a.

At the multiplier 98a, the average intensity value of error signals ek is weighted in accordance with a suitable operational equation based on the average intensity of the analog signal r(t) detected by the average received signal intensity detecting section 99a. The weighting is accomplished with the same object with that of the second embodiment described above.

Accordingly, in contrast to the second embodiment where the weighting is carried out to each error signal intensity detected every code element of the training signal rk, in the third embodiment, since the weighting is carried out to the average value of intensities of the error signals ek, it becomes possible to greatly reduce the calculating amount.

Figure 11:
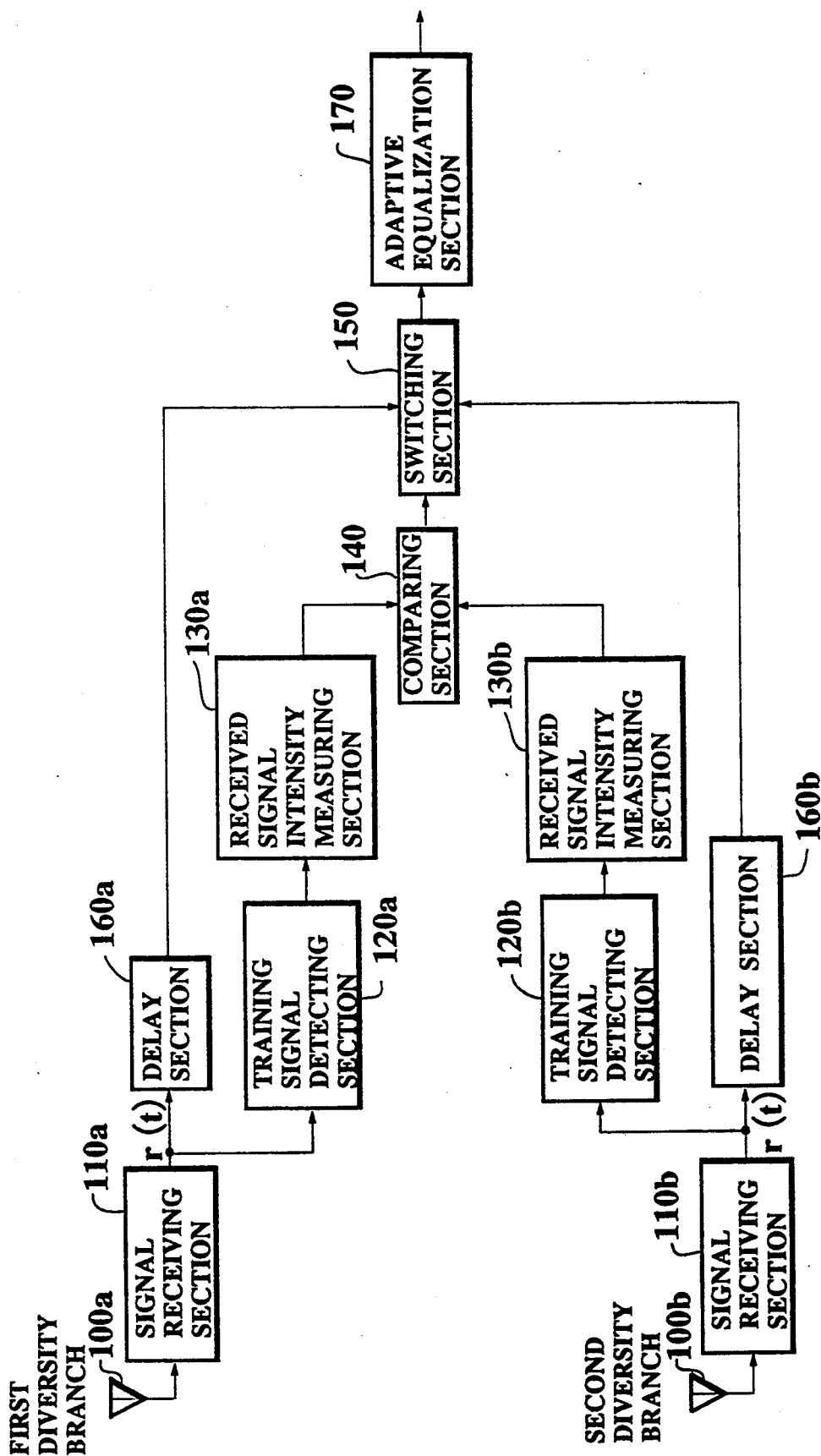
FIG. 11 is a block diagram to show a diversity receiver related to a second modification.

FIG. 11 shows a block diagram of a diversity receiver related to a first embodiment of a second modification.

The diversity receiver of this embodiment also processes an already-known training signal a and an unknown data signal b as processed in the respective embodiments of the first modification, and comprises a first and a second diversity branch for respectively receiving signals through different transmission routes. The first diversity branch comprises an antenna 100a for receiving an analog signal r(t) of a carrier frequency zone, a signal receiving section 110a for changing a carrier wave carrying the received signal into an intermediate frequency and amplifying the signal, a training signal detecting section 120a for detecting only a training signal a of the former half portion of the analog signal r(t) received by the signal receiving section 110a, a received signal intensity measuring section 130a for measuring the electric field intensity of the training signal a detected by the detecting section 120a, and a delay section 160a for delaying the training signal a of the analog signal r(t) received by the signal receiving section 110a by the training mode period shown in FIG. 4.

While, the second diversity branch has the same construction as in the first diversity branch, and comprises an antenna 100b, a signal receiving section 110b, a training signal detecting section 120b, a received signal intensity measuring section 130b, and a delay section 160b.

Moreover, the diversity receiver has selecting means, and the selecting means comprises a comparing section 140 for comparing electric field intensities measured by the received signal intensity measuring sections 130a, 130b, a switching section 150 for selecting a diversity branch of a received signal intensity measuring section having the greatest electric field intensity decided by compared electric field intensities measured b y the received signal intensity measuring sections 130a, 130b with each other at the comparing section 140, and an adaptive equalization section 170 for equalizing the analog signal r(t) received by the diversity branch selected by the switching section 150.

In such construction, a frequency of a signal received at the antenna 100a of the first diversity branch is selected and amplified by the signal receiving section 110a, then the signal is transmitted to the training signal detecting section 120a. Then, the training signal detecting section 120a detects a training signal a in the received signal every burst, and transmits the resultant information to the received signal intensity measuring section 130a. Thereafter, the received signal intensity measuring section 130a measures the electric field intensity at the time. Then, the field electric intensity measured at the received signal intensity measuring section 130a is transmitted to the comparing section 140.

While, in the second diversity branch, the same operation is carried out as described in the first diversity branch.

Figure 12:
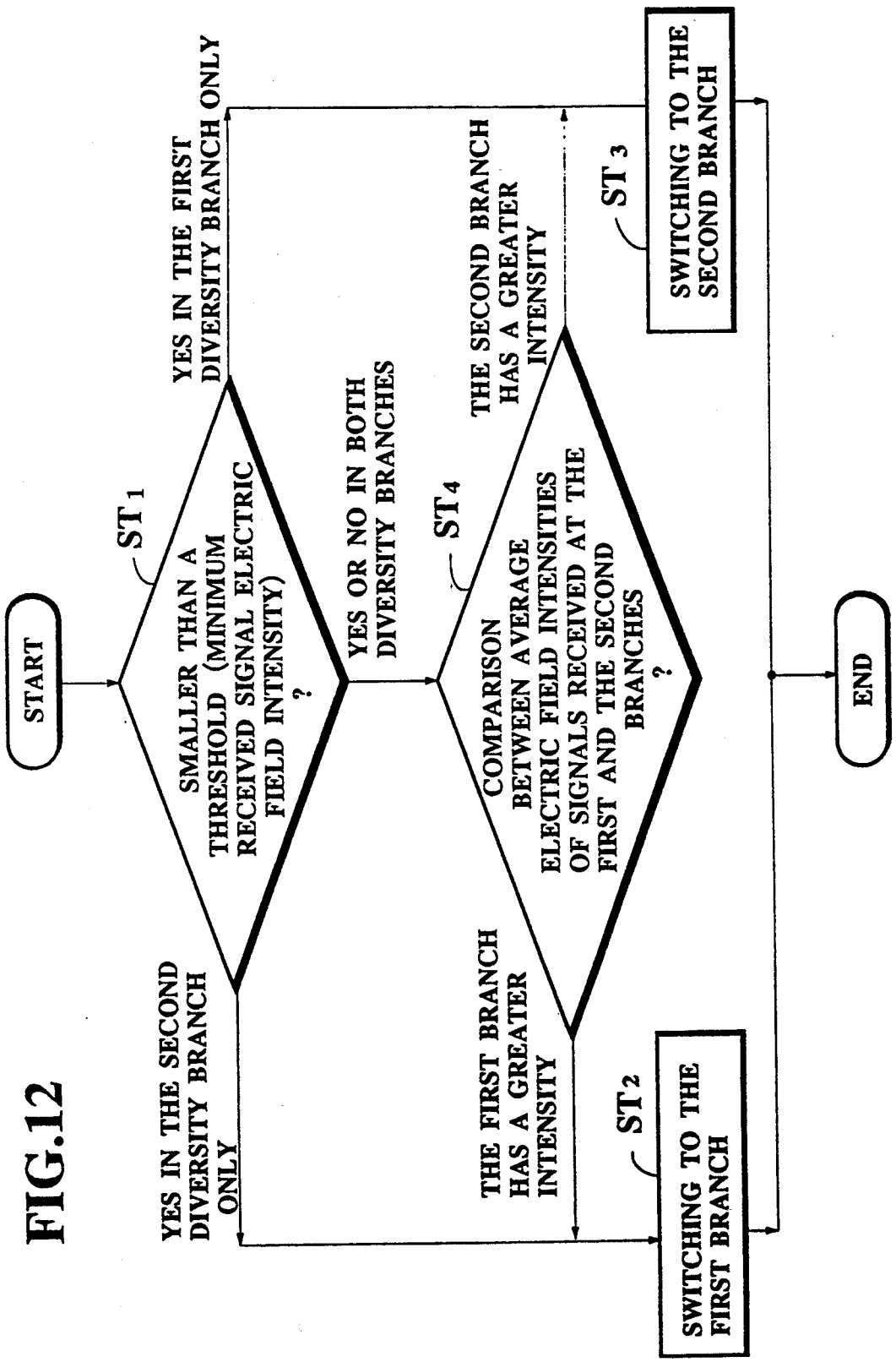
FIG. 12 is a flowchart to show the operation of the receiver shown in FIG. 11 and FIG. 16, FIGS. 13 to 15 show examples of each signal electric field intensity of the signals received by each diversity branch of the receivers related to the first modification and the second modification.

Then, the electric field intensities measured at the received signal intensity measuring sections 130a, 130b of the first and the second diversity branch are compared with each other at the comparing section 140 every time the training mode is completed, thereafter switching control of the diversity branches is carried out at the switching section 150 in accordance with a flowchart shown in FIG. 12.

Namely, as shown in FIG. 12, at the comparing section 140, the minimum value of each electric field intensity of the received training signals a transmitted from the first and the second diversity branch is compared with a predetermined minimum value (threshold value) at a step ST1. Then, at the switching section 150, the first diversity branch is selected when the minimum value of electric field intensity of the signal received at the second diversity branch only is smaller than the threshold value (step ST2). Conversely, when only the minimum value of each electric field intensity of the signal received at the first diversity branch only is smaller than the threshold value, the second diversity branch is selected (step ST3). Moreover, when both of the minimum values of the electric field intensity of the signals received at the first and the second diversity branch are smaller or greater than the threshold value, each average received electric field intensity of training signals a received at the first and the second diversity branch is compared with each other, and the divesity branch having the greater one is selected (step ST4). In this case, when the average received electric field intensity of the first diversity branch is greater, the flow proceeds to the step ST2. Conversely, when the average received electric field intensity of the second diversity branch is greater, the flow proceeds to the step ST4.

In this case, when the first diversity branch is selected, the analog signal r(t) is delayed at the delay section 160a by a predetermined time so that a timing transmitting of the analog signal r(t) from the delay section 160a to the switching section 160 coincides with a timing changing diversity branches with each other at the switching section 150. Then, the analog signal r(t) is transmitted to the adaptive equalization section 170 through the switching section 150, and is equalized.

Next, the switching control carried out by the comparing section 140 and the switching section 150 when the analog signals r(t) are received by the respective diversity branches is explained in detail with reference to FIGS. 13 to 15.

Figure 13:
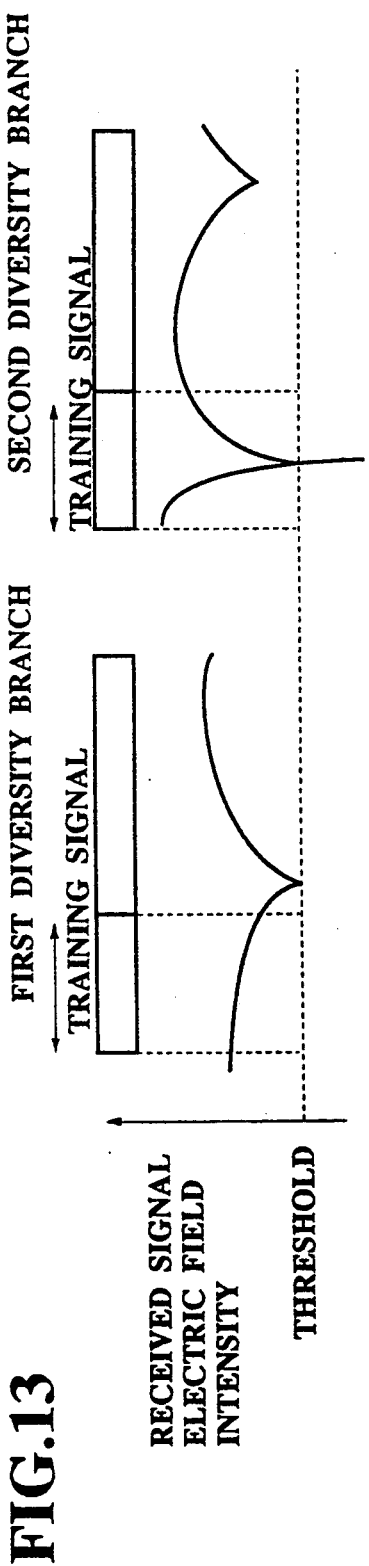

For example, in case of a first signal as shown in FIG. 13, the average received electric field intensity of a training signal received by the first diversity branch is smaller than the average received electric field intensity of a training signal received by the second diversity branch. While, with respect to the minimum received electric field intensity, the value of the second diversity branch is smaller than that of the first, and is also smaller than the threshold value. Accordingly, since the minimum received electric field intensity of the second diversity branch is smaller than the threshold value, the comparing section 140 and the switching section 150 select the first diversity branch in proceeding to the steps ST1, ST2 at the flowchart shown in FIG. 12.

Figure 14:
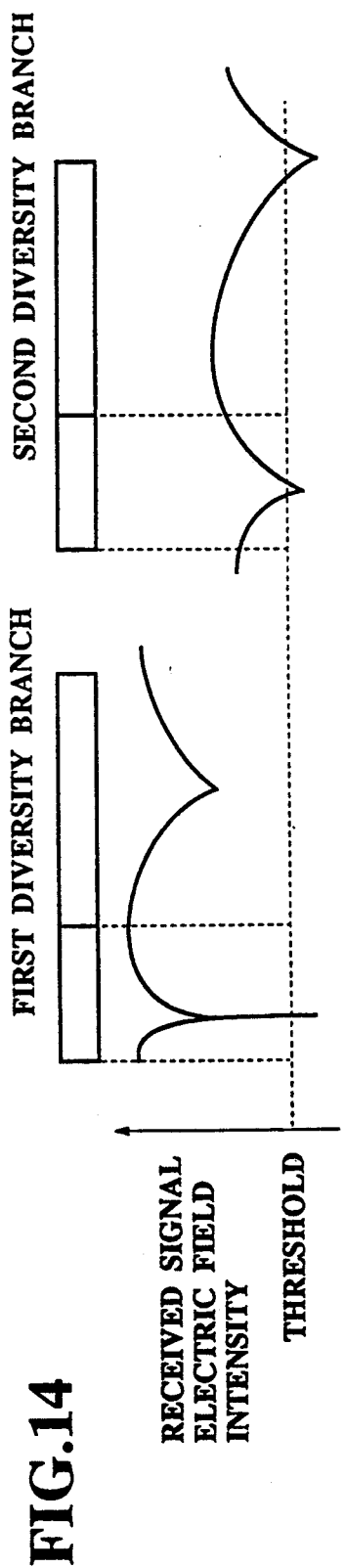
Figure 15:
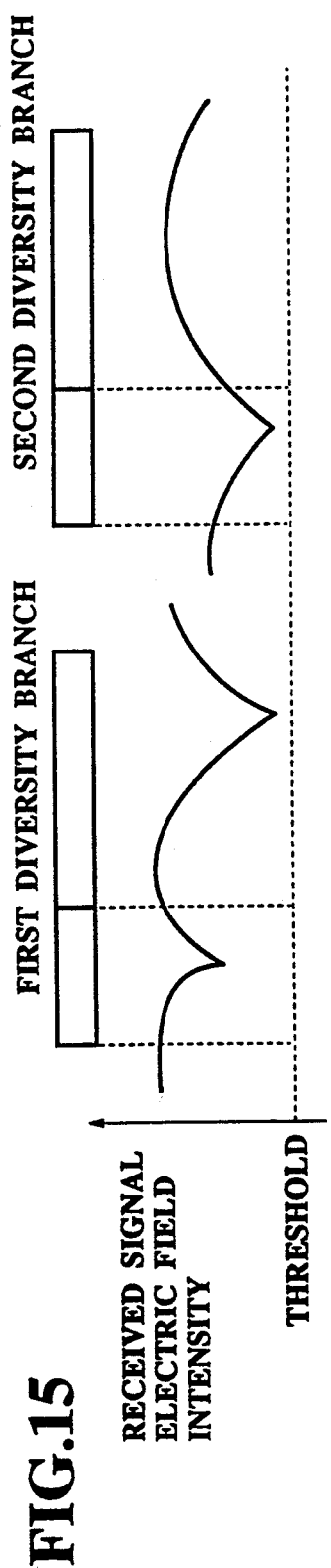

On the other hand, in case of a second signal as shown in FIG. 14, both of the minimum values of each electric field intensity of the training signals received at the first and the second diversity branch are smaller than the threshold value. Moreover, in case of a third signal as shown in FIG. 15, both of the minimum values of each electric field intensity of the training signals received at the first and the second diversity branch are greater than the threshold value. Accordingly, in case of the second and the third signal, the switching procedure is shifted from the step ST1 to the step ST4 in accordance with the flowchart shown in FIG. 12.

Moreover, since the value of the average received electric field intensity of the training signal at the fist diversity branch is greater than that at the second branch in both of the cases, the flow of switching control proceeds to the step ST2 so as to select the first diversity branch.

Accordingly, in this embodiment, though the process of the received signal is delayed by a transmission period of the training signal, since only one adaptive equalization means requiring a relatively large layout area is required for the plurality of diversity branches, it becomes possible to reduce the size and the weight of the system.

Accordingly, the diversity receiver having such construction as described above is the most suitable to use for a mobile station such as a car.

FIG. 16 shows a block diagram of a diversity receiver of an embodiment related to a third modification.

In the diversity receiver of this embodiment, the construction is almost the same as that of the embodiment in the second modification, except that the delay sections 160a, 160b are respectively replaced with memory sections 180a, 180b.

The diversity receiver having the above-mentioned construction is used related to such a European type packet b2 in one burst of an analog signal r(t) as shown in FIG. 17.

Namely, an analog signal r(t) received at a first diversity branch is converted into an intermediate frequency at a signal receiving section 110a, and amplified, then stored into the memory section 180a. Then, a training signal a only is detected from the analog signal r(t) stored in the memory section 180a at a training signal detecting section 120a. The detected training signal a is transmitted to a received signal intensity is measured. Then, the electric field intensity measured at the received signal intensity measuring section 130a is transmitted to a comparing section 140.

On the other hand, also in a second diversity branch, the same operation is carried out as described in the first diversity branch.

Moreover, the electric field intensities respectively measured at the received signal intensity measuring sections 130a, 130b of the first and the second diversity branch are compared with each other at the comparing section 140 every time the training mode period is completed, then selection of the diversity branches is carried out at a switching section 150 in accordance with the flowchart shown in FIG. 12. Subsequently, an analog signal r(t) received at the selected diversity branch is transmitted to an adaptive equalization section 170 through the switching section 150, then is equalized.

Accordingly, in this embodiment, since all the analog signals r(t) respectively received by the diversity branches are temporarily stored in the memory sections 180a, 180b, even when a training signal b is located at the latter half portion of one of the analog signals r(t), a suitable diversity branch can be selected by detecting only the training signal b. Namely, the diversity receiver of this type is suitable to use in digital mobile communication of the European type.

It should be apparently understood that the present invention is not limited to the above embodiments, and that the present invention can be used in suitable design alteration or modification.

What is claimed is:

1. A diversity receiver having a plurality of diversity branches for equalizing a data signal distorted in a signal transmission route thereof by utilizing a training signal transmitted prior to the data signal, each of the diversity branches comprising:
   signal receiving means for receiving the training signal and the data signal respectively distorted in the signal transmission route;
   sampling means for sampling the training signal received by the signal receiving means to output distorted code elements of the training signal;
   equalization means for equalizing the training signal sampled by the sampling means with tap coefficients, equalized code elements being generated by equalizing the distorted code elements of the training signal, and the tap coefficients being adjustable;
   training signal generating means for generating undistorted code elements of the training signal, the training signal not distorted in the signal transmission route being stored in the training signal generating means in advance;
   error signal generating means for generating an error signal indicating the difference between the equalized code elements generated by the equalization means and the undistorted code elements generated by the training signal generating means, the error signal being generated for each equalized code element;
   tap coefficient control means for renewing the tap coefficients utilized by the equalization means so as to decrease the difference indicated by the error signal generated by the error signal generating means,
   (i) the tap coefficients being renewed for each equalized code element,
   (ii) a distorted code element E1, following a distorted code element E2, being equalized by the equalization means with the tap coefficients renewed by utilizing the distorted code element E2, and
   (iii) the intensity of the error signal generated by the error signal generating means becoming stable after the tap coefficients are renewed a prescribed number of times;
   intensity detecting means for detecting intensity of the error signal generated by the error signal generating means for each equalized code element; and
   average value calculating means for calculating an average value of the intensity of the error signals detected by the intensity detecting means after the intensity of the error signal becomes stable, and the diversity receiver further including:
   selecting means for selecting one of a plurality of diversity branches in which the smallest average value of the intensity of the error signals among a plurality of the average values calculated in the diversity branches is calculated by the average value calculating means, the data signal received by the signal receiving means being equalized with the renewed tap coefficients in the branch selected by the selecting means.

2. Diversity receiver according to claim 1, wherein the selecting means is so constructed as to stop operation of diversity branches which are not selected by the selecting means by outputting a shut-down signal thereto.

3. A diversity receiver according to claim 1, wherein each of the divesity branches further includes:
   received signal intensity detecting means for detecting electric field intensity of the training signal received by the signal receiving means for each equalized code element and for determining a weight value proportional to the electric field intensity signal; and
   multiplying means for multiplying the intensity of the error signal detected by the intensity detecting means by the weight value determined by the received signal intensity detecting means, an average value of the intensity of the error signals multiplied by the multiplying means being calculated by the average value calculating means.

4. A diversity receiver according to claim 1, wherein each of the diversity branches further includes:
   average received signal intensity detecting means for detecting average electric field intensity of the training signal received by the signal receiving means and for determining an average weight value proportional to the average electric field intensity of the training signal; and
   multiplying means for multiplying the average value of the intensity of the error signals calculated by the average value calculating means by the average weight value determined by the average received signal intensity detecting means, the selecting means selecting one of a plurality of branches in which the average value of the intensity of the error signals multiplied by the multiplying means is the smallest.

5. A diversity receiver having a plurality of diversity branches for equalizing a data signal distorted in a signal transmission route therefor by utilizing a training signal transmitted prior to the data signal, each of the diversity branches comprising:

signal receiving means for receiving the training signal and the data signal respectively distorted in the signal transmission route;

training signal detecting means for detecting only the training signal received by the signal receiving means;

received signal intensity measuring means for measuring the electric field intensity of the training signal detected by the training signal detecting means; and delay means for delaying both the training signal and the data signal received by the signal receiving means to compensate for any time delays while the training signal is processed by the training signal detecting means and the received signal intensity measuring means, and the diversity receiver further including:

selecting means for selecting one of a plurality of diversity branches in which the largest electric field intensity of the training signal among the electric field intensity of the training signals measured in the branches is measured by the received signal intensity measuring means;

sampling means for sampling the training signal delayed by the delay means of the diversity branch which is selected by the selecting means to output distorted code elements of the training signal;

equalization means for equalizing the training signal sampled by the sampling means with tap coefficients, equalized code elements being generated by equalizing the distorted code elements of the training signal, and the tap coefficients being adjustable;

training signal generating means for generating undistorted code elements of the training signal, the training signal not distorted in the signal transmission route being stored in the training signal generated means in advance;

error signal generating means for generating an error signal indicating the difference between the equalized code elements generated by the equalization means and undistorted code elements generated by the training signal generating means, the error signal being generated for each equalized code element; and tap coefficient control means for renewing the tap coefficients utilized by the equalization means so as to decrease the difference indicated by the error signal generated by the error signal generating means, (i) the tap coefficient being renewed for each equalized code element, (ii) a distorted code element E1 following the distorted code element E2 being equalized by the equalization means with the tap coefficients renewed by utilizing the distorted code element E2, and (iii) the intensity of the error signal generated by the error signal generating means becoming stable after the tap coefficients are renewed prescribed times, whereby the data signal delayed by the delay means of the branch which is selected by the selecting means is equalized with the renewed tap coefficients.

6. Diversity receiver according to claim 5, wherein the selecting means stops operation of diversity branches which are not selected by the selecting means by outputting a stop signal.

7. A diversity receiver having a plurality of diversity branches for equalizing one or more data signals distorted in a signal transmission route thereof by utilizing a training signal, each of diversity branches comprising:

signal receiving means for receiving the training signal and the data signals respectively distorted in the signal transmission route;

memory means for storing both the training signal and the data signals received by the signal receiving means;

training signal detecting means for detecting only the training signal stored in the memory means; and received signal intensity measuring means for measuring the electric field intensity of the training signal detected by the training signal detecting means, and the diversity receiver further including:

selecting means for selecting one of a plurality of diversity branches in which the largest electric field intensity of the training signal among the electric field intensity of the training signals measured in the branches is measured by the received signal intensity measuring mean;

sampling means for sampling the training signal stored in the memory means of the diversity branch which is selected by the selecting means to output distorted code elements of the training signal;

equalization means for equalizing the training signal sampled by the sampling means with tap coefficients, equalized code elements being generated by equalizing the distorted code elements of the training signal, and the tap coefficients being adjustable;

training signal generating means for generating undistorted code elements of the training signal, the training signal not distorted in the signal transmission route being stored in the training signal generating means in advance;

error signal generating means for generating an error signal indicating the difference between the equalized code elements generated by the equalization means and undistorted code elements generated by the training signal generating means, the error signal being generated for each equalized code element; and tap coefficient control means for renewing the tap coefficients utilized by the equalization means so as to decrease the difference indicated by the error signal generated by the error signal generating means, (i) the tap coefficients being renewed for each equalized code element, (ii) a distorted code element E1 following the distorted code element E2 being equalized by the equalization means with the tap coefficients renewed by utilizing the distorted code element E2, and (iii) the intensity of the error signal generated by the error signal generating means becoming stable after the tap coefficients are renewed prescribed times, whereby the data signals stored in the memory means of the branch which is selected by the selecting means is equalized with the renewed tap coefficients.

8. Diversity receiver according to claim 7, wherein the selecting means stops operation of diversity branches which are not selected by the selecting means by outputting a stop signal.

* * * * *